United States Patent [19]

Maksymkiw et al.

[11] Patent Number: 5,624,758
[45] Date of Patent: Apr. 29, 1997

[54] WATER-BASED ADHESIVE FORMULATION HAVING ENHANCED CHARACTERISTICS

[75] Inventors: Mike Maksymkiw, White Bear Lake; Gary Haider, Maplewood; Michael Dochniak, St. Paul; Leonard Jannusch, White Bear Lake; Paul Wade, Stillwater, all of Minn.

[73] Assignee: H.B. Fuller Licensing & Financing, Inc., Arden Hills, Minn.

[21] Appl. No.: 617,099

[22] Filed: Mar. 18, 1996

Related U.S. Application Data

[62] Division of Ser. No. 484,347, Jun. 7, 1995, Pat. No. 5,523,344.

[51] Int. Cl.$^6$ .......................... B32B 27/00; B32B 27/40; A43B 9/12; A43B 13/32
[52] U.S. Cl. ................... 428/423.1; 428/423.4; 428/423.9; 428/425.1; 36/83; 36/19.5; 36/DIG. 1
[58] Field of Search .................. 524/155, 168, 524/169, 284, 292, 296, 297, 303, 311, 507; 523/415; 525/123, 127, 438, 454, 455, 457, 458; 428/423.1, 423.4, 423.9, 425.1; 36/83, 19.5, DIG. 1

[56] References Cited

U.S. PATENT DOCUMENTS

| | | | |
|---|---|---|---|
| 4,303,774 | 12/1981 | Nachtkamp et al. | 528/71 |
| 4,636,546 | 1/1987 | Chao | 524/507 |
| 4,870,129 | 9/1989 | Henning et al. | 524/597 |
| 5,334,690 | 8/1994 | Schafheutle et al. | 528/71 |
| 5,373,050 | 12/1994 | Morikawa et al. | 524/591 |

FOREIGN PATENT DOCUMENTS 9304018 of 0000 Germany.

OTHER PUBLICATIONS

Derwent Abstract of: JP 57030776 (Feb. 1982).
"Dispercoll Trial Products KA 8464 and KA 8481 as raw materials for water–based dispersion adhesives", Gauster et al. Bayer AG (Aug. 1989).

Derwent Abstract of: JP 6256749 (Sep. 1994).
"Product Information –Dispercoll KA–8464, Aqueous Polyurethane Dispersion" of Mobay Corporation, a Bayer USA Inc. Co., Pittsburgh, PA Rev. Jan. 1989.
"New High Performance Urethane Dispersion for Adhesives" Technical Information Sheet by Zeneca Resins, Wilmington, MA, (Jan. 1983).
"NEOTAC R–9320" Technical Information, ICI Resins US, Wilmington, MA, Bulletin R–9320, Revised Apr. 1992.
"Airflex 320 Base for Adhesives" by Air Products & Chemicals, Inc. 1989 (month unknown).
"Unitex 108" by Unitex Chemical Corp., Greensboro, N.C. 27406 (undated).
"Material Safety Data Sheet for Benzoflex®50 Plasticizer" by Velsicol Chemical Corporation, Rosemount, IL, (Aug. 1991).
Derwent abstract for: US 4644030 issued Feb. 1987.
Derwent abstract for: JP 63023972 published Feb. 1988.
"Polyurethane dispersions and emulsifiable polyisocyantes for water based adhesives," Holmbach, Bayer AG (Jul. 1990).

*Primary Examiner*—Paul R. Michl
*Assistant Examiner*—Patrick Niland
*Attorney, Agent, or Firm*—Vidas, Arrett & Steinkraus, P.A.

[57] ABSTRACT

Adhesive formulations are blends of aqueous polymer dispersions and a hydrophobic plasticizer. The blended dispersed polymers include at least one hard sulfonated polyester urethane, at least one soft non-sulfonated polyester urethane, and at least one polar non-polyurethane water-based polymer or copolymer. A high molecular weight elastomeric non-sulfonated polyurethane polymer and a crosslinker are optional further components in the blend. The formulations are useful as non-heat activating, one-component adhesives which generate excellent green strength, water and heat resistant bonds.

3 Claims, No Drawings

WATER-BASED ADHESIVE FORMULATION HAVING ENHANCED CHARACTERISTICS

This application is a division of application Ser. No. 08/484,347, filed Jun. 7, 1995 now U.S. Pat. No. 5,523,344.

BACKGROUND OF THE INVENTION

1. Field of the Invention

This invention relates to a new water-based adhesive formulation. Specifically, a formulation having enhanced characteristics such as excellent adhesion without heat activation. More specifically, it relates to a one-component aqueous sulfonated polyurethane adhesive formulation having enhanced properties for use in applications where use of heat for activation is undesirable or unavailable.

2. Description of the Prior Art

Aqueous polyurethane dispersions have received a great deal of attention recently. These dispersions are compatible with many other water-based polymers, and adhesives made from them usually exhibit improved performance. Examples of these activities can be found in JP 57030776 and JP 83046277. These patents disclose heat curing, water-resistant and stable adhesive compositions comprising dispersions of partially saponified polyvinyl acetate, aqueous solutions of polyurethanes and dispersable polyisocyanate compounds. The adhesive properties of these compositions are generated with a heat curing cycle.

JP 6256749 discloses another adhesive composition prepared by adding polyisocyanate crosslinking agents to a blend of aqueous polyurethane resins and polyvinyl latex. This polyurethane based adhesive composition is reported to exhibit high adhesion, and excellent heat and water resistance.

German Utility Model patent no. 9304018 discloses an adhesive comprising at least a two component polyurethane dispersion having a pot life of 12 hours. This water-based formulation describes a polymer blend of polyurethane dispersions, EVA's or methacrylic derivatives, characterized in that it comprises one essentially non-hydrophobic plasticizer.

A draw back for these prior art compositions is the need for heat activation, making them unsuitable for use where heat for activation is either unavailable or destructive to the substrates or parts being bonded together.

The present inventors have now discovered a one-component sulfonated aqueous polyurethane dispersion based adhesive formulation having excellent adhesive properties, good green strength, solvent resistance, and capable of forming moisture and heat resistant bonds without heat activation.

SUMMARY OF THE INVENTION

The present invention is directed to a novel adhesive formulation comprising plasticized aqueous polyurethane dispersion blends. The formulations of the invention provide excellent adhesion properties upon pressurized joining of coated substrates. This adhesion property, without heat activation, and the unexpected heat resistant properties of the resulting bonds on aging, are believed to be unique properties for polyurethane dispersion adhesive formulations. The inventive adhesive formulations have properties superior to polychloroprene (e.g. Neoprene®) based contact adhesives, have good green strength and moisture resistance and can be spray-coagulated with acids (e.g. by HYDRO-pHUSE™ process).

The preferred formulations of the invention, when used with a crosslinker, have very long pot-lives, in some cases up to a month or more after addition of the crosslinker. Surprisingly, such formulations even after a month exhibit excellent green strength characteristics without heat activation. This allows formulations containing crosslinking additives to be shipped by the manufacturer as one-component compositions, and provides a substantially improved convenience to the end user.

The applied adhesive films have a useful life or "open time" (time between the making of said films and the using of said films to form the bonded structure) ranging from about an hour to a few hours, depending on the composition of the dispersion and the crosslinkers chosen.

The invention is also directed to the use of the inventive formulations as adhesives and to an adhesively bonded structure comprising said formulation as the adhesive.

The inventive adhesive formulations comprise:

a) at least one hydrophobic plasticizer, for instance a member of the group consisting of alkyl and aryl sulfonamides, benzoate esters, phthalate esters, adipates, titrates, and mixtures thereof; and b) an aqueous polyurethane dispersion blend comprising:
1) at least one hard sulfonated polyester urethane;
2) at least one soft non-sulfonated polyester urethane; and
3) at least one polar non-polyurethane water-based polymer or copolymer.

A high molecular weight non-sulfonated polyurethane polymer and/or a crosslinker, such as a dispersable polyisocyanate crosslinker, are optional components employed in preferred embodiments of the invention.

The invention also relates to a polyurethane dispersion based adhesive formulation containing an interpenetrating network having crosslinked matrixes for improved heat, moisture and solvent resistance, and to the process of manufacture and use of the same.

DETAILED DESCRIPTION OF THE INVENTION

In the inventive adhesive formulations an aqueous polyurethane dispersion blend is employed which includes at least one "hard" sulfonated polyester urethane, at least one "soft" non-sulfonated polyester urethane; and at least one polar non-polyurethane water-based polymer or copolymer.

The "hard" sulfonated polyester polyurethane is a relatively high molecular weight anionic sulfonated polyester urethane polymer which is characterized by a shear storage modulus (G') having a value of from about $10^9$ to about $10^{10}$ dynes/cm$^2$ at 25° C. and a frequency of 10 radians/sec. The relatively high molecular weight, polyurethane useful as the hard polyurethane in the aqueous polyurethane dispersion blends of the present invention can be linear aliphatic, cyclic aliphatic, or aromatic sulfonated polyester urethanes, preferably formed from at least one sulfonated polyamine or polyol and one or more diisocyanates. A suitable example of such a sulfonated polyester polyurethane dispersion is Dispercoll™ KA-8464, sold by Mobay Corporation, Pittsburgh, Pa. The hard polyurethane dispersion solids may comprise from about 15 parts to about 35 parts, preferably from about 20 parts to about 30 parts, based on 100 parts total solids.

The "soft" non-sulfonated polyurethane component of the inventive blends is a relatively low molecular weight polyurethane polymer characterized by a shear storage modulus (G') having a value of from about $10^6$ dynes/cm$^2$ to about $10^8$ dynes/cm$^2$ at 25° C. and 10 radians/sec. It can be formed from linear aliphatic, cyclic aliphatic, or aromatic non-sulfonated polyester urethanes, preferably formed from diisocyanates such as isophorone diisocyanate (IPDI), hexamethylene diisocyanate (HDI), tetramethylxylylene diisocyanate (TMXDI), and mixtures thereof. Such polymers are tacky and give the final adhesive composition added tack and improved initial green strength characteristics. The soft polyurethane dispersion solids are present from about 15 parts to about 35 parts and preferably from about 20 parts to about 30 parts, based on 100 parts total solids.

The blended dispersion also includes a polar, non-polyurethane water-based polymer or copolymer component. Addition of at least one such polar, water-based polymer or copolymer can improve the sprayability of the dispersion. Examples of these polymers or copolymers include vinyl acetate-ethylene copolymers, acrylic polymers, vinyl acetate polymers and other vinyl polymers. The polar, non-polyurethane water-based polymer or copolymer solids comprise from about 5 parts to about 40 parts, and preferably from about 5 parts to about 15 parts, based on 100 parts total solids.

The inventive formulations also include a hydrophobic plasticizer. The hydrophobic plasticizers enhance the water resistance properties of the adhesive. They can be selected from the group consisting of alkyl and aryl sulfonamides, benzoate esters, phthalate esters, adipates, citrates, and mixtures thereof. Particularly preferred are alkyl sulfonamides, aryl sulfonamides, alkylene glycol benzoates, dialkylene glycol benzoates, and mixtures thereof. The amount of plasticizer present in the adhesive composition can vary from about 1 part to 40 parts, and preferably from about 20 parts to about 40 parts, based on 100 parts total solids.

The sulfonated polyester urethanes contain ionomers capable of strong hydrogen bonding and ionic dipole interactions. These strong intermolecular forces give the polymers improved heat and water resistance, as well as good adhesive properties. These same high inter-molecular forces also oppose plasticization. This is well known in the art. The documentation can be found in the proceedings of the Plasticization and Plasticizer Processes symposium sponsored by the Division of Industrial and Engineering Chemistry at the 147th meeting of the American Chemical Society, Philadelphia, Pa., Apr. 6–7, 1964. The adhesive compositions of the present invention surprisingly possess good adhesive properties without heat activation, using hydrophobic plasticizers.

A preferred embodiment can comprise:

a) at least one hydrophobic plasticizer selected from the group consisting of alkyl and aryl sulfonamides, benzoate esters, phthalate esters, adipates, citrates, and mixtures thereof; and b) an aqueous polyurethane dispersion comprising
1) at least one high molecular weight sulfonated polyester urethane;
2) at least one high molecular weight non-sulfonated polyester urethane;
3) at least one tacky non-sulfonated polyester urethane; and
4) at least one polar non-polyurethane water-based polymer or copolymer.

In this embodiment the non-sulfonated high molecular weight polyester urethanes can be crystalline or semi-crystalline linear aliphatic, cyclic aliphatic, or aromatic polyester urethanes, preferably also formed from diisocyanates such as isophorone diisocyanate (IPDI), hexamethylenediisocyanate (HDI), and mixtures thereof. Preferably this component has elastomeric properties. It may comprise from about 10 parts to about 30 parts, preferably from about 15 parts to about 25 parts, based on 100 parts total solids.

The adhesive compositions of the present invention may include a water dispersable crosslinker. Conventional water-dispersible polyfunctional chemically activatable crosslinking agents are useful for the present invention. These crosslinking agents include dispersable formulations of polyfunctional aziridines, isocyanates, melamine resins, epoxies, oxazolines, carbodiimides and other polyfunctional crosslinkers. Typically, the crosslinking agents are added at a level of about 1 to about 20 parts, preferably from about 5 parts to about 15 parts based on 100 parts total solids. It is surmised that when crosslinking agents are added to the polyurethane dispersion adhesive composition, an interpenetrating or interconnected network having crosslinked matrixes is formed which link the blended polymers with covalent and/or non-covalent linkages. The crosslinked network gives the adhesive composition further improved heat, moisture and solvent resistance. A surprising feature of preferred embodiments of the invention is that the crosslinker can be added to the adhesives at least a month before use without destabilizing (gelling or high sedimentation) the system. Therefore the crosslinked compositions can be prepared by the supplier before shipping to the end user.

The crosslinked or uncrosslinked adhesives of the invention, in some cases, can be applied to one or both substrates and subsequently successfully bonded, with pressure but without heat, as long as several hours later and still give adhesive strength properties which are similar to those obtained when the substrates are joined promptly after application and drying or coagulation of the adhesive. This is a further significant advance in the art of aqueous dispersion adhesives since it allows for separation of the adhesive application and bonding steps so that the adhesive can be preapplied, for instance in a batch process and then bonded assemblies can be subsequently prepared on a batch basis.

An especially preferred embodiment of the invention is an adhesive composition which comprises:

a) at least one hydrophobic plasticizer selected from the group consisting of alkyl and aryl sulfonamides, benzoate esters, phthalate esters, adipates, citrates, and mixtures thereof; and b) an aqueous polyurethane dispersion comprising
1) at least one high molecular weight sulfonated polyester urethane;
2) at least one high molecular weight non-sulfonated polyester urethane;
3) at least one tacky non-sulfonated polyester urethane; and
4) at least one polar non-polyurethane water-based polymer or copolymer; and c) at least one polyfunctional crosslinking agent selected from the group consisting of chemically activatable crosslinkers.

To prepare the adhesive formulations of the invention the aqueous polymer dispersions are blended together with mild agitation and then the hydrophobic plasticizer is added. Crosslinkers are added last.

Application of the adhesive formulations of the invention can be accomplished in either one-side mode or two-side mode. In the one-side mode the adhesive is applied to one of two substrates to be joined and dried, coagulated with acid or spray coagulated (acid added in spray droplet) for instance by the HYDROpHUSE™ process. The second substrate is then brought into contact with the adhesive coated substrate with pressure. In the two-side mode the adhesive is applied to both substrates to be joined and then the substrates are brought together with pressure. The fact that heat activation is not required to accomplish bonding gives the formulations the characteristics of contact adhesives, a unique characteristic for polyurethane dispersion adhesives.

It is especially surprising that even the crosslinked adhesive compositions possess good adhesive properties without heat activation.

These adhesives can be used either in the aqueous dispersion form, or in the form of a cast film, to bond both porous and non-porous substrates, for applications in the automotive, aerospace, and others where regular heat activatable and/or heat curing polyurethane dispersion adhesive formulations are being used. They are especially useful in applications where the use of heat for activation is either not available or destructive to the substrates. Such applications can include film to film lamination.

Although not necessary to obtain good bonding, substrates coated with formulations of the invention can also be bonded with heat activation if desired.

The present invention is further illustrated by the following nonlimiting examples. All parts are by weight unless otherwise specified.

EXAMPLES

In the following examples the following test methods were used.

Test 1. Peel Adhesion (Non-porous Substrates)

The samples for testing were prepared in the following manner. The adhesive formulations were coated on two 15.2 cm by 17.8 cm sheets of polyvinyl chloride (PVC) using a #40 Meyer rod. The substrates were then dried at room temperature and pressed together using a Sentinal Heat sealer at room temperature for 30 sec. at 206.8 kPa (30 psi) nip pressure. After aging at ambient conditions for 72 hours, the sheets were cut into 2.5 cm by 17.8 cm strips and tested for peel adhesion on the Twing Albert 500.

Test 2. Peel Adhesion Failure Temperatures (Porous Substrates)

The samples for testing were prepared and tested in the same manner as Test 1, except that the substrates used were 2.5 cm by 2.5 cm samples of canvas which were bonded in a T-peel configuration and placed in the Tenney oven. The T-peels were subjected to a 25° C. increase in temperature each hour until bond failure, and the temperatures and the times were recorded by the Tenney sensing unit.

Test 3. Peel Adhesion (Mixed Non-porous Substrates)

The samples for testing were prepared and tested in the same manner as Test 1, except that one substrate was ABS (acrylonitrile-butadiene-styrene block copolymer) and the other substrate was PVC. Bonds were assembled with a pressure of 206.8 kPa (30 psi) 30 sec. at room temperature and at 82° C. (180° F.). Bonded assemblies were prepared as in Test 1 and tested for green strength promptly after bonding and then after aging the bond for 3 weeks.

In the formulations described below, component quantities are given in parts by weight.

EXAMPLES 1–4

Blended formulations were prepared as shown in Table 1 below. After formulation of the blended adhesive, the formulations were subjected to Peel Adhesion testing under the conditions specified above for Tests 1 and 2 above. Results are shown in Table 1 below.

TABLE 1

| Components | Example 1 | Example 2 | Example 3 | Example 4 |
|---|---|---|---|---|
| Hard Sulfonated Polyester Polyurethane (Dispercoll K-8464, Miles Inc.) | 36.57 | 34.74 | 36.57 | 34.74 |
| High Mol. Wt. Non-Sulfonated Polyurethane (Neorez R-9630, Zeneca Resins) | 12.29 | 11.67 | 12.29 | 11.67 |
| Soft Tacky Non-Sulfonated Polyurethane (Neorez R-9320, Zeneca Resins) | 26.13 | 24.84 | 26.13 | 24.84 |
| Hydrophobic Sulfonamide Plasticizer (Uniplex 108, Unitex Chemical) | 15.49 | 14.71 | — | — |
| Hydrophobic Benzoate Plasticizer (Benzoflex 50) | — | — | 15.49 | 14.71 |
| Vinyl acetate ethylene copolymer emulsion (Airflex 320, Air Products Inc.) | 9.52 | 9.04 | 9.52 | 9.04 |
| Polyisocyanate crosslinker (Desmondur DA, Miles Inc.) | — | 5.00 | — | 5.00 |
| Test Results | | | | |
| Test 1 (kg/cm) | 3.24 | 2.93 | 2.40 | 2.69 |
| Test 2 (°C.) | 46 | 79 | 60 | 101 |

EXAMPLES 5–7

Formulations were prepared as shown in Table 2 below in the same manner as described for Examples 1–4. Testing was the same as for Examples 1–4 except that the Example 7 formulation was also subjected to Test 3, described above. Test results are also given in Table 2. Example 5 is a comparative formulation which does not include the hydrophobic plasticizer component of the inventive formulations.

TABLE 2

| | Comparative 5 | Invention 6 | Invention 7 |
|---|---|---|---|
| Hard Sulfonated Polyester Polyurethane (Dispercoll K-8464) | 43.27 | 36.57 | 34.82 |
| (High Mol. Wt. Non-Sulfonated Polyurethane (Neorez R-9630) | 30.91 | 26.13 | 24.88 |
| Soft Tacky Non-Sulfonated Polyurethane (Neorez R-9320) | 14.54 | 12.29 | 11.70 |
| Hydrophobic Plasticizer (N-ethyl-toluene sulfonamide mixture | — | 15.49 | 14.76 |
| Hydrophilic Plasticizer (Triacetin) | — | — | — |
| Vinyl acetate ethylene copolymer emulsion (Airflex 320) | 11.28 | 9.52 | 9.07 |
| Polyisocyanate crosslinker (Desmondur DA) | — | — | 4.77 |
| Test Results | | | |
| Test 1 (kg/cm) | 0.11 | 3.24 | 2.93 |
| Test 2 (°C.) | 61 | 46 | 79 |
| Test 3 (kg/cm) - Immediately | | | |
| Room Temp | | | 2.50 |
| [82° C.] | | | 0.95 |

TABLE 2-continued

| | Example | | |
|---|---|---|---|
| | Comparative | Invention | |
| | 5 | 6 | 7 |
| Test 3 (kg/cm) - Aged 3 weeks | | | |
| Room Temp | | | 1.72 |
| [82° C.] | | | 0.91 |

EXAMPLE 8

A formulation was prepared as in Example 1 using the following components:

Dispercoll K-8464 35.4

Neorez R-9630 25.3

Neorez R-9320 11.9

Uniplex 108 15.0

Airflex 320 9.2

Desmondur DA 5.0

The adhesive was applied with a paint brush to chrome leather. SBR rubber sheet and suede leather samples and allowed to dry. Contact bonds were formed at room temperature with hand pressure between adhesive coated samples of chrome leather and SBR sheet and between adhesive coated SBR rubber sheet and suede leather. When pulled apart, both samples failed by substrate failure of the leather substrate indicating that the adhesive bond was stronger than the substrate, and demonstrating the utility of the adhesive as a cold contact shoe adhesive.

The same adhesive was applied with a paint brush to ponderosa pine blocks 7.5 cm ×7.5 cm square, allowed to dry for 10–15 minutes and then contact bonded with hand pressure at room temperature. The samples produced immediate strength which could not be broken by hand shear or torsion forces. When pried apart with a hammer and chisel the bond broke by wood failure, demonstrating the utility of the adhesive as a cold contact wood adhesive.

EXAMPLE 9

An adhesive formulation as described in the previous example was tested for carpet-to-fiberglass (glass fiber/polyester laminate) wet and dry peel strength. The samples were prepared for testing by spray application to both surfaces at a dry spread rate of 54 g/m² (5 g/ft² ). The adhesive were spray-coagulated (HYDROpHUSE™) with a Mattson Crossfire™ spray gun using a dilute solution of citric acid as the acid which is mixed in the spray process. Carpet laminations were made on both the gel coat and the rough side of marine fiberglass. The coated substrates were immediately joined with a 2.3 kg (5 lb) hand roller. 180° peel tests were completed after aging of the resulting bonded assembly for 7 days at ambient conditions. The test instrument was a 3M90 peel tester run at 30 cc/min. 30 sec. peel.

Bonded and aged assemblies prepared in the same manner as described in the previous paragraph were placed in 22° C. water for 24 hours after which peel strengths were measured in the same manner.

In addition to the formulation of Example 8 with citric acid coagulation, a competitive water based adhesive 3M Fastbond™ 2000 NF, spray-coagulated with Fastbond™ zinc sulfate, and a commercial SBR solvent cement, spray applied, were tested in the same manner. It was noted that the diisocyanate crosslinker employed in the formulation of Example 8 could not be satisfactorily added to the Fastbond 2000 NF formulation because the pot-life was too short in the high pH system of that adhesive. Results are given in Table 3 where all values are kg/cm.

TABLE 3

| | Dry | | Wet | |
|---|---|---|---|---|
| Product | Gel Coat Side | Rough Side | Gel Coat Side | Rough Side |
| Example 8 | 2.1 | 1.4 | 2.1 | 1.0 |
| SBR solvent cement | 0.8 | 1.0 | 0.7 | 0.1 |
| 3M Fastbond 2000 NF | 0.9 | 0.5 | 0.9 | 0.2 |

What is claimed is:

1. A bonded assembly comprising a pair of substrates adhesively bonded wherein as is adhesive is a dried or coagulated disperson of an adhesive dispersion, said adhesive dispersion comprising a:
   a) at least one hydrophobic plasticizer, and
   b) a blended mixture of dispersed polymers, the mixture comprising:
      1) at least one hard sulfonated polyester urethane;
      2) at least one soft non-sulfonated polyester urethane; and
      3) at least one polar non-polyurethane water-based polymer or copolymer.

2. An bonded assembly as in claim 1 wherein at least one of said substrates is a member of the group consisting of leather, rubber, synthetic polymers and wood.

3. A bonded assembly as in claim 1 wherein said assembly is a shoe.

* * * * *

UNITED STATES PATENT AND TRADEMARK OFFICE
CERTIFICATE OF CORRECTION

PATENT NO. : 5,624,758

DATED : APRIL 29, 1997

INVENTOR(S) : Mike Maksymkiw, et al

It is certified that error appears in the above-identified patent and that said Letters Patent is hereby corrected as shown below:

Col. 2, line 22, delete "titrates" and insert -- citrates --

Signed and Sealed this

Second Day of September, 1997

*Attest:*

BRUCE LEHMAN

*Attesting Officer*  Commissioner of Patents and Trademarks